(No Model.)
G. W. RODEBAUGH.
Saw Guides.
No. 230,499. Patented July 27, 1880.
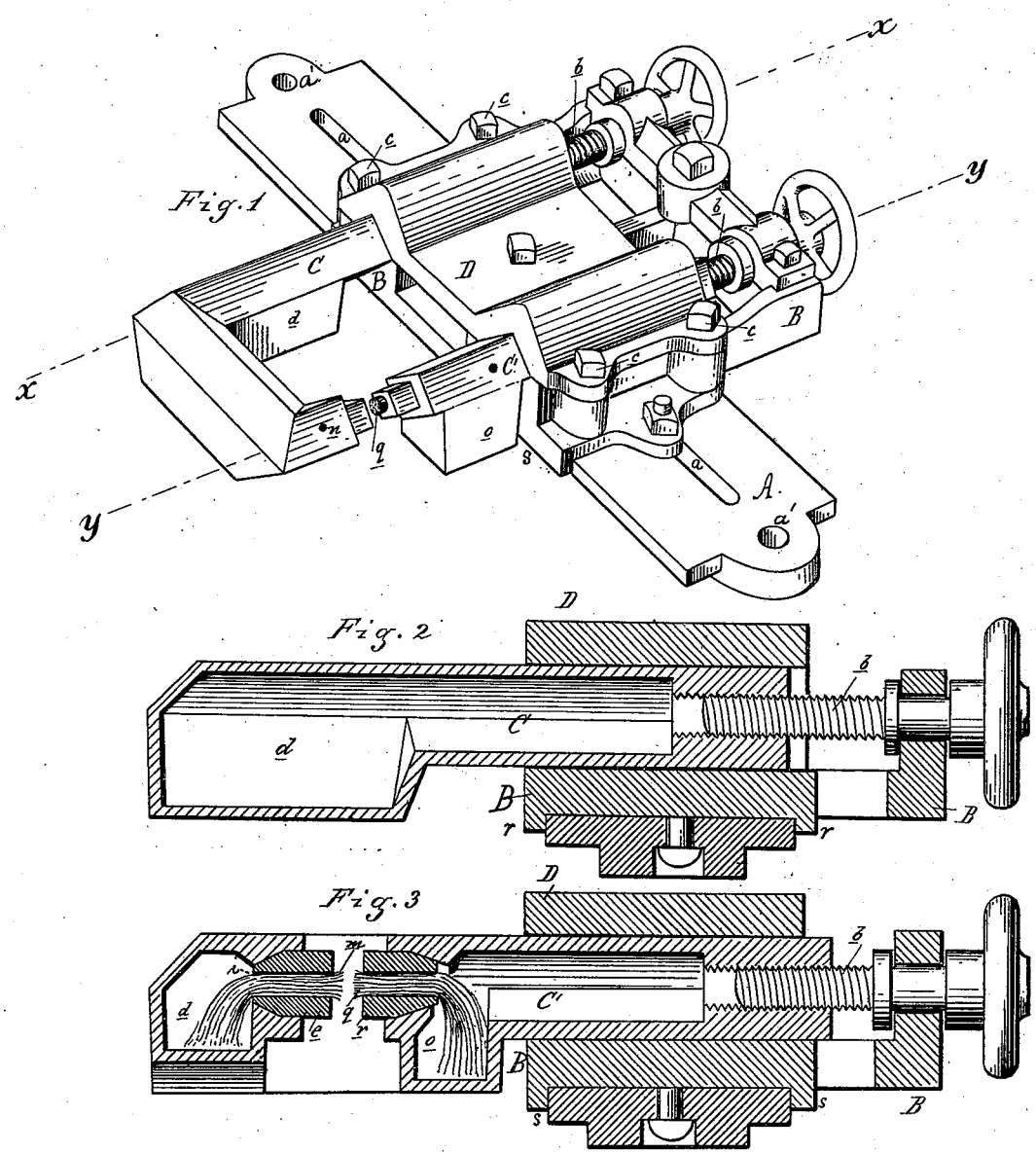
Attest:
A. Barthel
Chas. J. Hunt
Inventor:
G. W. Rodebaugh
By Atty
Thos. S. Sprague

UNITED STATES PATENT OFFICE.

GEORGE W. RODEBAUGH, OF JACKSON, MICHIGAN.

SAW-GUIDE.

SPECIFICATION forming part of Letters Patent No. 230,499, dated July 27, 1880.

Application filed April 15, 1880. (No model.)

*To all whom it may concern:*

Be it known that I, GEORGE W. RODEBAUGH, of the city and county of Jackson, and State of Michigan, have invented an Improvement in Saw-Guides, of which the following is a specification.

The nature of my invention relates to new and useful improvements in the construction of devices to hold saws, either rotary or reciprocating, in position, and at the same time to lubricate them to make them run truly without heating and without buckling.

The invention consists in the peculiar construction and combination of parts, as more fully hereinafter described, and then pointed out in the claims.

Figure 1 is a perspective view of my improved device. Figs. 2 and 3 are vertical longitudinal sections through the slides C C'.

In the accompanying drawings, which form a part of this specification, A represents the bed-plate, provided with a slot, $a$, and holes $a'$, by means of which latter and suitable bolts it may be attached to any convenient part of the mill.

A frame, B, provided with the lips $s$, embracing the edges of the bed-plate, rests upon the latter and forms a bearing for the set-screws $b$, the ends of which are tapped into the ends of the slides C and C', which are secured to the plates, parallel with each other, by the cap D and the bolts $c$. The frame B is adjustable on the bed-plate by means of the slot $a$ in the latter and screw-bolts passing through the slot and the frame B.

The slide C is angular and hollow, and provided with an enlarged chamber, $d$, and terminates in a bearing, $e$, through which is an orifice, $i$, through which a wick, $m$, is drawn, communicating with oil or any suitable lubricant in the chamber $d$, which is filled therewith through an opening, $n$. The slide C is straight and also hollow, and is provided with an enlarged chamber, $o$, and with a bearing, $r$, precisely like the one already described, and is also provided with a wick, $q$.

The two bearings $e$ and $r$ are placed directly opposite each other and directly in line with the central axis of the slide C'.

By means of the set-screws $b$ the bearings $e$ and $r$ may be regulated to any desired distance apart, as may be required by the varying thickness of saws, thereby forming the saw-guides.

By means of the wick the lubricant is drawn by capillary attraction from the chambers in the slides, and delivered by contact to the face of the saw.

With guides of this construction attached suitably all buckling and heating of the saw is avoided and a large saving in lubricants effected.

What I claim as my invention is—

1. The adjustable slides C C', provided with oil-chambers having contracted orifices to hold the wick, whereby the oil is retained in the chamber until withdrawn by capillary attraction, substantially as described.

2. The removable bearings $e$ $r$, having parallel faces and each provided with an orifice forming the mouth of a chamber capable of holding oil, whereby said bearings serve as adjustable guides for the saw and also as wick-holders, through which the oil passes by capillary attraction, substantially as described, and for the purpose set forth.

3. The combination, with the hollow slides C C', provided with the chambers $d$ $o$, capable of holding oil, and adjusting-screws $b$, of the removable bearings $e$ $r$, having central orifices above the bottom of the oil-chambers, and the wicks $m$ $q$, substantially as described, and for the purpose set forth.

4. The combination, with the slotted bed-plate A, provided with the holes $a'$, of the frame B, adjustable on the bed-plate, and carrying the adjusting-screws $b$, hollow angular slide C, hollow straight slide C', having oil-chambers $d$ $o$, bearings $e$ $r$, having central orifices, and wicks $m$ $q$, substantially as described, and for the purpose set forth.

GEORGE W. RODEBAUGH.

Witnesses:
H. S. SPRAGUE,
CHARLES J. HUNT.